(12) United States Patent
Battaglini et al.

(10) Patent No.: US 7,415,442 B1
(45) Date of Patent: Aug. 19, 2008

(54) INTEGRATED TECHNOLOGY MONEY TRANSFER SYSTEM

(75) Inventors: Stephen D. Battaglini, Las Vegas, NV (US); Michael D. Battaglini, Vero Beach, FL (US); Gil Starkey, West Caldwell, NJ (US)

(73) Assignee: Integrated Technological Systems, Inc., Las Vegas, NV (US)

( * ) Notice: Subject to any disclaimer, the term of this patent is extended or adjusted under 35 U.S.C. 154(b) by 632 days.

(21) Appl. No.: 10/027,035

(22) Filed: Dec. 27, 2001

Related U.S. Application Data (63) Continuation-in-part of application No. 09/965,510, filed on Sep. 26, 2001, now abandoned.

(60) Provisional application No. 60/235,782, filed on Sep. 26, 2000.

(51) Int. Cl.
*G07F 7/08* (2006.01)
(52) U.S. Cl. ............... 705/64; 705/41; 705/39; 705/44; 235/380
(58) Field of Classification Search ............ 705/14, 705/64, 39–44, 50; 235/379, 380; 380/255
See application file for complete search history.

(56) References Cited

U.S. PATENT DOCUMENTS

| | | | | |
|---|---|---|---|---|
| 4,750,119 A * | 6/1988 | Cohen et al. ................ 705/14 |
| 4,837,422 A | 6/1989 | Dethloff .................... 235/308 |
| 5,350,906 A | 9/1994 | Brody ....................... 235/379 |
| 5,426,281 A * | 6/1995 | Abecassis ................... 235/379 |
| 5,650,604 A * | 7/1997 | Marcous et al. .............. 235/379 |
| 5,825,003 A * | 10/1998 | Jennings et al. ............. 235/379 |
| 5,883,377 A * | 3/1999 | Chapin, Jr. .................. 235/493 |
| 5,884,290 A | 3/1999 | Smorodinsky ................ 705/44 |
| 5,953,710 A | 9/1999 | Fleming ..................... 705/38 |
| 5,963,647 A * | 10/1999 | Downing et al. ............. 705/39 |
| 5,991,748 A | 11/1999 | Taskett ...................... 705/41 |
| 6,032,136 A | 2/2000 | Brake, Jr. ................... 705/41 |
| 6,039,250 A * | 3/2000 | Ito et al. .................... 235/379 |
| 6,044,360 A | 3/2000 | Picciallo .................... 705/21 |
| 6,061,664 A | 5/2000 | Pieterse ..................... 705/39 |
| 6,161,121 A * | 12/2000 | Hardy et al. ................ 380/255 |
| 6,502,747 B1 * | 1/2003 | Stoutenburg et al. ......... 235/379 |
| 6,554,184 B1 * | 4/2003 | Amos ........................ 705/42 |
| 6,736,314 B2 * | 5/2004 | Cooper et al. .............. 235/379 |
| 6,769,605 B1 * | 8/2004 | Magness .................... 705/39 |
| 2001/0037290 A1 * | 11/2001 | Lai .......................... 705/39 |

(Continued)

*Primary Examiner*—Andrew J. Fischer
*Assistant Examiner*—John Winter
(74) *Attorney, Agent, or Firm*—Brian S. Steinberger; Law Offices of Brian S. Steinberger, P.A.

(57) ABSTRACT

Money transfer system authorizing an escrow agent computer electronically by touch-tone telephone, computer modem, P.O.S.(point of sale) terminal, live operators, to send cash transfers from a sender's account such as their credit, debit, bank, or ATM card, or a bank account, to a recipient who accesses the money at any remote ATM type location or P.O.S.(point of sale) terminal by using cards such as a specialized magnetic cards, credit cards, debit cards, and automated teller machine(ATM) card, at anytime and anywhere. Senders can authorize the transfer by touch-tone and PIN (personal identification number) secure codes. The system can operate without pre-existing relationships, and monitor transactions and take surcharges based on transfer amounts, and use a cards tethered to ATM machines and be used with double magnetic sided cards.

28 Claims, 8 Drawing Sheets

U.S. PATENT DOCUMENTS

| | | | |
|---|---|---|---|
| 2001/0047328 A1* | 11/2001 | Triola | 705/39 |
| 2002/0087462 A1* | 7/2002 | Seifert et al. | 705/39 |
| 2003/0080185 A1* | 5/2003 | Werther | 235/380 |
| 2004/0139019 A1* | 7/2004 | Cooper | 705/44 |
| 2005/0246541 A1* | 11/2005 | Ginter et al. | 713/176 |

* cited by examiner

Sender Process:

Figure 2B

Recipient Process:

INTEGRATED TECHNOLOGY MONEY TRANSFER SYSTEM

CROSS-REFERENCE TO RELATED APPLICATIONS

This application is a continuation-in-part of U.S. patent application Ser. No. 09/965,510 filed Sep. 26, 2001 now abandoned, and claims the benefit of priority of U.S. Provisional Application Ser. No. 60/235,782 filed Sep. 26, 2000.

This invention relates to money transfers, and in particular to a method and system for quickly and easily sending cash from one party via electronic mediums such as touch-tone phones and computer modems using one of a credit card, debit card, ATM(automated teller machine) card, and/or a bank card and/or bank checking account and/or bank savings account, to a remotely located party who can access any ATM(automated teller machine) by using a magnetic card such as a specialized magnetic strip card(referred to herein as a Cash Magic(CM) card, a credit card, debit card, ATM card, and the like.

BACKGROUND AND PRIOR ART

There are existing services available to initiate remote cash disbursements. For example, Western Union and Money Gram currently service more than 90% of the market for sending remote cash disbursements from one party to another. In 1997 alone, there were an estimated 48 million money transfers from Western Union, and approximately 9 million money transfers from MoneyGram, with the total amount of funds transferred being over $17 billion dollars, and the average transfer amount being approximately $300.00 with each transfer having an average transfer fee of approximately $29.00. In addition to the high transfer fee costs, there are other problems with these known services. For example, both Western Union and Money Gram offer limited hours of availability and a limited number of cash disbursement locations for the recipient. In 1997 there were approximately 40,000 Western Union locations worldwide and approximately 69,000 planned MoneyGram locations. Thus, if a location is not near a sender and a recipient, delays and inconvenience are common results of using these services. These services further require having paid persons at the cash location pickup sites, that add additional expenses to their use.

Over the years, various types of patents have been proposed for using debit type cards for money transfers. See for example, U.S. Pat. No. 4,837,422 to Dethloff et al.; U.S. Pat. No. 5,350,906 to Brody et al.; U.S. Pat. No. 5,884,290 to Smorodinsky et al.; U.S. Pat. No. 5,953,710 to Fleming; U.S. Pat. No. 5,991,748 to Taskett; U.S. Pat. No. 6,032,136 to Brake, Jr. et al.; U.S. Pat. No. 6,044,360 to Picciallo; and U.S. Pat. No. 6,061,664 to Pieterse et al.

Dethloff '422 discloses a multi-user card where one party can assign cash values to the cards for being used by third parties having access to PIN type numbers, and is primarily limited to being an IC(integrated circuit) card and not to a card that uses a magnetic type stripe. Additionally, this patent requires that users possess related cards in advance of needing a money transfer Brody '290 describes using a magnetic type card where a sponsor can allow a remote user a selected PIN number and use of a money transfer by card/account of an issuer. Brody '290 generally requires "sponsors", which are generally retail type outlets to sell pre-programmed cards or to place amounts on the magnetic cards by store clerks. Additionally, this system would require ATM(automated teller machines) having programs to transfer money from the issuer account to a sub-account and to an ATM in the same "sponsor" chain having that program.

Smorodinsky et al. '290 describes a money transfer system for paying bills using intercoupled computers, that requires pre-arranged accounts billing payment authorization between three computers.

Fleming '710 describes a system in which a credit or debit card issuer can issue a parent held card and one or more pre-linked child held cards, where the parent can control the available funds accessible by the child held cards. This system requires that the cards be linked by a pre-arrangement relationship to each other.

Taskett '748 describes a combined prepaid telephone type card and "transaction instrument" (credit or debit card) for allowing fund transfers from the "transaction card" to the prepaid telephone type card, and requires a pre-existing type connection and/or pre-existing ink between the credit/debit card and the prepaid telephone type card.

Brake, Jr. et al. '136 describes a prepaid telephone card or gasoline type card which can have a secondary use as a credit card, but is not used as a money transfer card.

Picciallo '360 describes a magnetic card system where the cards can be given to third parties and charged remotely but require "pre-established customer accounts", for the transfers, and further requires the recipient to have a card pre-correlated to a secondary(or sub-account) of the pre-established fund holding account.

Pieterse et al. '664 describes a rechargeable type smart card system primarily for electronic orders and payments and can use magnetic type cards, but not for money transfer type services.

Thus, the need exists for an improved system for transferring money to remote locations.

SUMMARY OF THE INVENTION

A primary objective of this invention is to provide a method and system for sending money transfers such as cash between a sender and a remotely located recipient without a pre-established relationship, such as an account link, between the parties.

A secondary objective of this invention is to provide a method and system for sending money transfers such as cash between a sender and a remotely located recipient automatically in other than the currency of origin, at the current foreign rate of exchange at the time of the payout.

A third objective of this invention is to provide a method and system for sending money transfers such as cash between a sender and a remotely located recipient, that has the safety and security of a bank escrow account acting as an agent between the parties.

A fourth objective of this invention is to provide a method and system for sending money transfers such as cash between a sender and a remotely located recipient where a deposit is made to a safe escrow account under an escrow contractual agreement which allows for payout upon proper transmission of the account number by the recipient.

A fifth objective of this invention is to provide a method and system for sending money transfers such as cash between a sender and any remotely located recipient, anywhere, and anytime.

A sixth objective of this invention is to provide a method and system for sending money transfers such as cash between a sender and a remotely located recipient having lower costs than traditional services such as Western Union, Money-Gram, and the like.

A seventh objective of this invention is to provide a method and system for sending unplanned money transfers such as emergency cash from anyone, anytime, anywhere to another party without any pre-arrangement existing between the sender and the recipient, the sender and the escrow agent middlemen, and the recipient and escrow agent middlemen.

An eighth objective of this invention is to provide a method and system for sending money transfers such as cash from one party to another where a cash management escrow agent enables the transfer to be automatically and simultaneously transferred for payment through an ATM (automated teller machine).

A ninth objective of this invention is to provide a method and system for sending money transfers such as cash between a sender and a remotely located recipient having access to a magnetic cash card, such as a debit card, a credit card, and/or an ATM(automated teller machine) card.

The tenth objective of this invention is to provide a method and system for sending money transfers such as cash from a sender to a remotely located recipient, with the sender only needing access to a debit card, credit card, bank card, and/or ATM(automated teller machine) card, and/or bank checking and/or bank savings account for the transfer.

The eleventh objective of this invention is provide a method and system for sending money transfers such as cash from a sender to a remotely located recipient that uses a magnetic card, and without requiring the use of "smart card" integrated circuit(IC) card technology.

The twelvth objective of the invention is to provide a method and system for using double magnetic sided cards to retrieve cash from senders with one stripe and to use the other striped side for other transactions such as for a phone card, credit card, debit card, and the like.

A preferred example of using the invention system allows for a sender to use a touch-tone telephone, a P.O.S.(point of sale) terminal, a computer modem and the like, to authorize a central escrow agent such as a national bank to apply funds from the sender's account such as their credit card, bank card, debit card, ATM(automated teller machine) card, bank checking account, bank savings account and the like, to a recipient at a remote location. The recipient can visit any ATM site and use a magnetic card such as a specialized magnetic card, their credit card, bank card, ATM card, or debit card to immediately and automatically retrieve the money transferred funds.

Sender of Money Transfer Using System can Authorize the Transfer as Follows

1. Sender uses a touch-tone telephone to call a toll-free CM(cash magic) number.
2. Call Center computer answers the call with several 'preliminary" prompts: English/Spanish, fee structure- if desired, terms of transactions, etc.
3. If you have a Credit Card, Debit Card or ATM Card with a PIN number and are ready to transfer the cash—Press 1.
4. Please enter the amount you want made available from an ATM in multiples of(for example) $20.00 (e.g., $300) then press the pound (#) sign.
5. Computer program computes charge.
6. The total amount which will be charged to your card will be (for example, $320). Press 1 to continue.
7. Please enter your Credit Card, Debit Card or ATM Card number.
8. Please enter your PIN number.
9. Please enter the CM card number to be used for withdrawal or Press the pound (#) sign if you want to transfer to any CM card with a PIN number to be assigned.
10. If card number entered:
    The computer processes the transfer from the caller's Credit Card, Debit Card or ATM Card and "deposits" the face amount plus the reserve for a possible ATM surcharge and the network processing fees to an "Escrow Account" with, for example, a 9-digit account number composed of the last 5-digits of the card number plus the 4-digit PIN number. The balance goes to the general income account.
11. If the pound sign (#) is pressed:
    The computer assigns a random account number described as a PIN number, advises the caller of the number and asks the caller to enter the number to confirm the recorded number then the pound (#) sign to complete the transaction. The computer processes the transfer from the caller's Credit Card, Debit Card or ATM Card and "deposits" the face amount plus the reserve for a possible ATM surcharge and network processing fees to an "Escrow Account" with the PIN number to complete the account number and the balance to the general income account.

Recipient Using The Invention System to Withdraw Money

1. Recipient inserts CM(cash magic) card, follows withdrawal prompts and enters for example, the PIN number.
2. CM computer program authorizes ATM pay-out, which virtually simultaneously occurs, ATM surcharge payment, if any, and payment of network processing fees.
3. Computer then transfers the excess reserve to the invention's "Excess Transfer Reserve Income Account."

Other miscellaneous information such as instructions to use the system, lost card and refund information, and the like can also be accessed by the users to this system.

For Each User of a Cash Magic(CM) Magnetic Card

A. For example, 4-digit PIN number can be permanently assigned each CM card, thereby becoming, when prefaced with the last, for example, 5 numbers individually assigned to each card, a, for example, 9-digit account number accessible by that card and the, for example, 4-digit PIN number. A second account can be accessible with any card and an account number referred to, and utilized at an ATM, as a PIN number.

B. The entry of a wrong PIN number at an ATM, or in a call center balance inquiry, will prompt a request that the correct PIN number be entered. If approximately two or more entries are not correct the transaction will be terminated and the card suspended for 1 hour to prevent fraudulent searching. Additional use(s) of the card with an incorrect PIN number can result in revocation of that card.

C. After, for example, approximately 48 hours, the intended recipient, with the CM card and the PIN number or the sender with the sender card number, can by phone or mail request CM to close the account and to send a check for a complete refund of the full amount paid by the sender, or such amount as may remain in the account due to only partial pay-out because of an ATM limitation, or because the international exchange rate caused payment only to the nearest foreign money multiple.

D. Any 'Transfer Money' left in the "Escrow Account" at the expiration of, for example, 5 years can be donated to a charity such as the American Cancer Society, and the like.

E. Cash can also be received from cooperative stores or banks which could "swipe" the card and put through a charge for the amount available to the recipient plus a fee reserved for the highest potential ATM surcharge or a portion of the same, thereby earning a fee for handling the transaction and paying out the cash. The customers can enter their own PIN number on the keypad as they presently do when utilizing any Debit Card's PIN number to make a purchase. Supermarkets and other businesses presently offer additional cash withdrawal which is added to the amount charged to the card. Signs offering to pay-out CM transfers are anticipated to be well received by businesses since it will result in additional income and additional potential customers with cash in hand inside their establishment.

The recipient can use a magnetic card entitled a Cash Magic(CM) card or a similar or different entitled card to use the invention. Additionally, the recipient of the money transfer can use a debit card, credit card, bank card, and ATM (automated teller machine) card to access the money transfer funds.

A tethered magnetic card can be fixably tethered at remotely located ATM(automatic teller machines) so that money transfer recipients do not need to carry a magnetic card with them.

Additionally, the card can have magnetic stripes on both sides for allowing for various uses of the card as needed. For example, one card can be used as a cash magic card, and the oposite side of the card can be used as a phone card, and the like.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

As stated in the background of the invention in 1997, there were at that time approximately 40,000 Western Union locations worldwide and approximately 69,000 planned MoneyGram locations. These known types of money transfer services would thus be limited to recipients having to locate these locations and also plan their time to be at the normal operating hours of those locations. The subject invention can use any ATM(automated teller machine) in the world. In 1997 alone there were more than 200,000 ATMs in the United States alone, more than double the number of Western Unions and MoneyGram locations at that time. Worldwide in 1997, there were more than 500,000 ATMs, which were approximately five times the number of Western Unions and MoneyGram locations. Additionally, the ATMs are generally accessible 24 hours a day, 7 days a week, and 365 days a year. The invention plans to have lower charges than the traditional Western Union and MoneyGram transaction fees.

The invention can be used with an existing bank for the deposit and withdrawal of transferred monies. The invention can even be implemented into an existing banks' use of ATMs by the leasing of their excess "white space" computer capacity. ATM usage and associated fees can be paid to the ATM owner and to network transfer and settlement service providers. The Credit Card, Debit Card or ATM Card issuer can enjoy the benefits of increased card usage. Fees for using the system can be covered by the bank and credit card issuers mailing of monthly statements.

Figure 1:
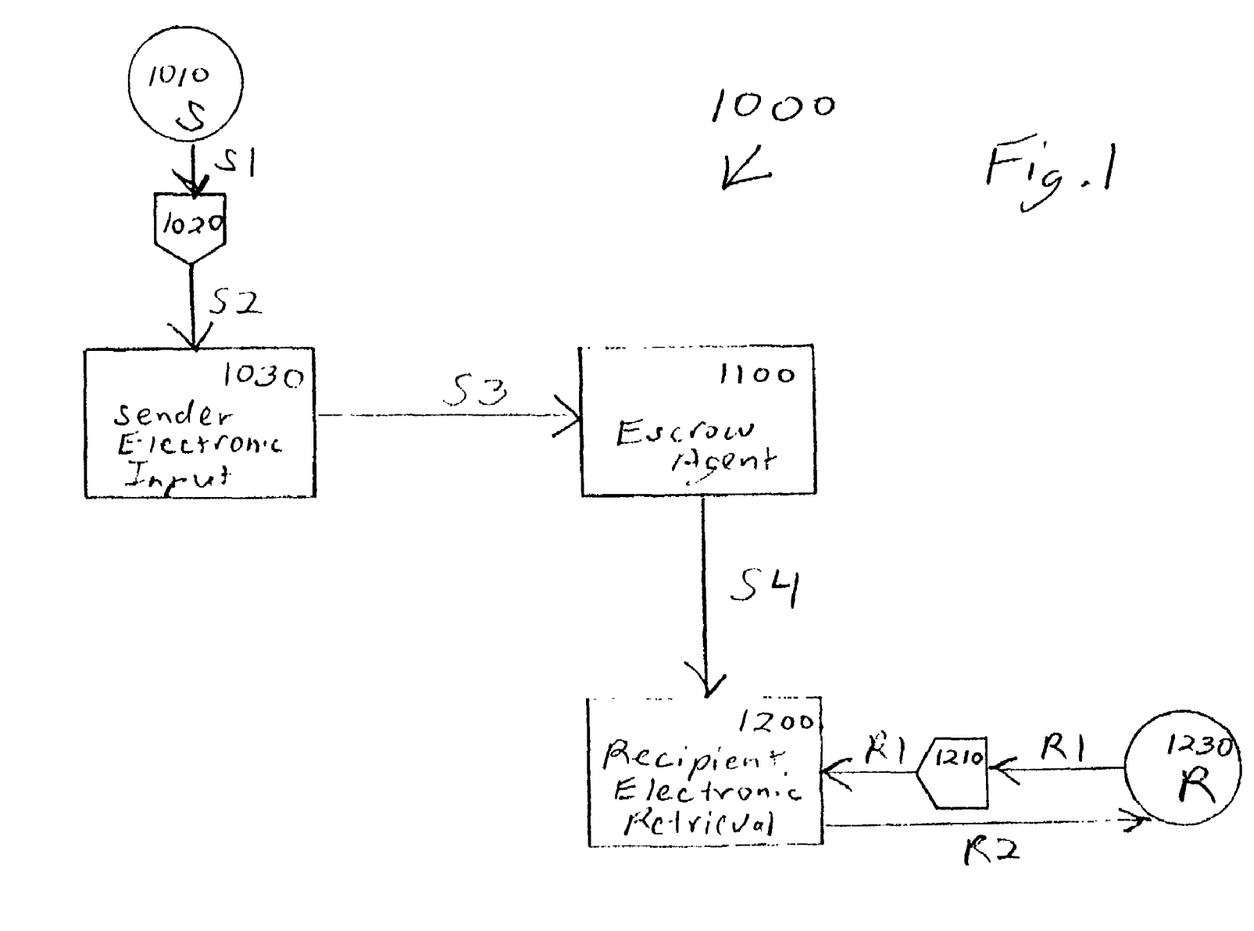
FIG. 1 shows an overview of a preferred embodiment of the novel invention.

FIG. 1 shows an overview of a preferred embodiment 1000 of the novel invention. Referring to FIG. 1, a sender 1010 can enter SI, account information from a sender account using account information from a variety of accounts such as that found on a card 1020 such as a credit card, bank card, automated teller machine(ATM) card, debit card, bank checking account, bank savings account, and the like. The sender 1010 authorizes a money transfer, such as a cash transfer, emergency funds transfer, and the like, to be taken from the sender's account, and can use a secure PIN(personal identification number). The account information, and amount of money transfer can be entered S2 via an electronic input device 1030 such as using a touch-tone telephone, a computer modem, an automated teller machine(ATM), and the like, which passes the information through transmission lines S3 such as telephone lines, wireless transmissions, and the like to a escrow agent storage site 1100 such as a national bank, repository agent, and the like. The electronic escrow agent 1 100 takes the money transfer funds, and subtracts out a transfer fee, and forwards the money transfer via S4 to the recipients remotely located electronic retrieval site 1200 such as an automated teller machine(ATM), where the recipient R, 1230 can retrieve the money transfer via a magnetic card 1210(such as a specialized Cash Magic(CM) card, credit card, debit card, bank card, or ATM card) by entering the magnetic card information(i.e. account number, and/or PI(personal identification number) and the like) RI to the electronic retrieval site 1200. Finally, the money transfer in the form of cash, or the like, can be retrieved, R2, by the recipient R, 1230.

The invention allows for the virtually simultaneous transfer of funds to the escrow agent with enough fees to allow for all processing fees to be deducted. The invention does not require special hardware since existing ATM terminals can easily be used with the invention.

The invention can allow a recipient to use magnetic cards such as a specialized Cash Magic card(which can initially be empty), credit cards, debit cards, bank cards, ATM cards, and does not require "smart card" integrated circuit (IC) technology, and thus eliminates the higher costs associated with using "smart cards", and the limited access to "smart card" devices.

Figure 2A:
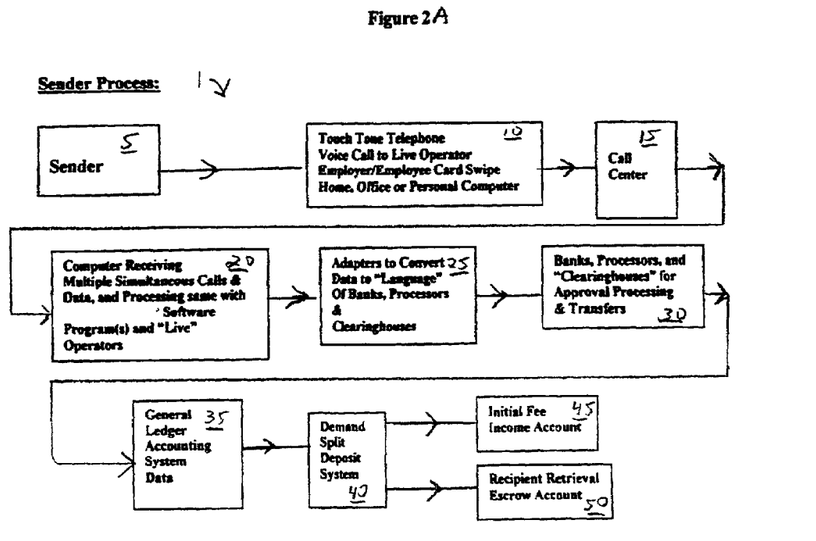
FIG. 2A shows an example of a Sender Process flow chart for the invention.

FIG. 2A shows an example of a Sender Process flow chart 1 for the invention. A sender 5 having monies who wishes to transfer the monies to a recipient party can use a contact medium 10, such as a touch tone telephone (for example using a toll free 800 number and the like) connecting to an IVR(Interactive Voice Response) system, and/or to a live operator, and/or an employer/employee card swipe, and/or with a home, office or personal computer to contact a Call Center 15. The latter routes the sender's call to a computer 20 which receives multiple simultaneous calls and data, and processes the same in automated modes with software. Next, the system can use further adapters 25 such as computer programs to convert the incomming data to the "Language" of the existing Banks, Processors and Clearinghouses. Next, the Banks, Processors, and Clearinghouses check 30 for Approval Processing and Transfers on monies from the Sender. Next, General Ledger Accounting System Data 35 is compiled to enable a Demand Split Deposit 40 which takes monies from the Sender for processing the Initial Fee transaction to an income account 45, and sends the authorized monies transfer to a Recipient Retrieval Escrow Account 50, for later pickup by the Recipient.

Figure 2B:
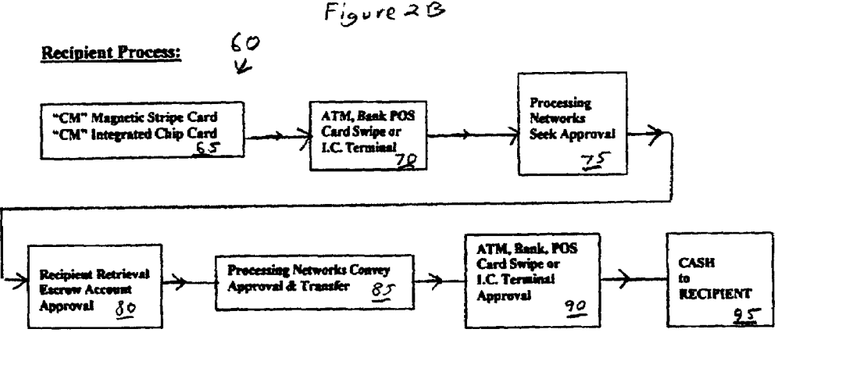
FIG. 2B shows an example of a Recipient Process flow chart for the invention.

FIG. 2B shows an example of a Recipient Process flow chart 60 for the invention(s). A recipient can use their "CM" (cash magic) Magnetic Stripe Card, "CM" Integrated Chip Card 65 to access a money machine 70 such as an ATM (automated teller machine), Bank Card Swipe Machine, or I.C.(integrated circuit) Terminal which passes information on the card to a Processing Network 75 to seek approval to use the card. Upon approval, the system processing networks 85 convey approval and transfer authorization to the money transfer machine 90 such as the ATM, Bank, POS Card Swipe or I.C. Terminal and cash 95 is disbursed to the Recipient.

The invention can be used with other channels of communication such as but not limited to the Internet via a Web front-end module, Wireless, Fax, and E-Mail. Other languages may also be added easily, as well as increased functionality.

With the subject invention a central bank can process the money transfer transactions which can include monetary transfers, financial security, logging, and history. Exchange rate information can also reside with the central bank.

Computers in the invention can store application specific data and application statistics, which can run on the IVR (Integrated Voice Response) computers. Customer-specific data can also reside on these computers.

The physical locations of the call centers and the IVR type computers used in FIGS. 2A-2B can be at the same or different locations. The bank computer can be at the same or different locations than the call centers and the IVR computers.

Figure 3:
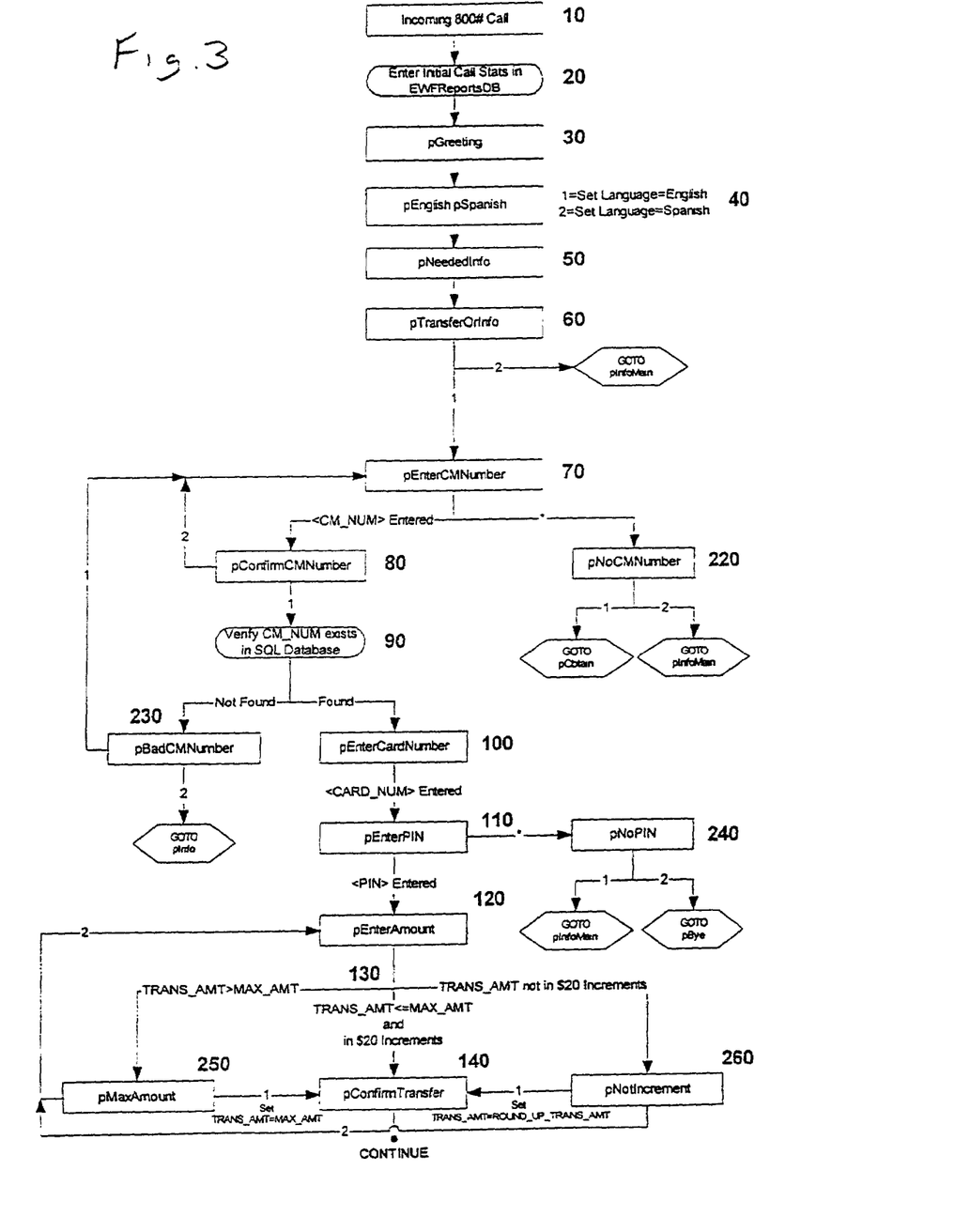
FIG. 3 shows a detailed call flow chart of the invention.
Figure 4A:
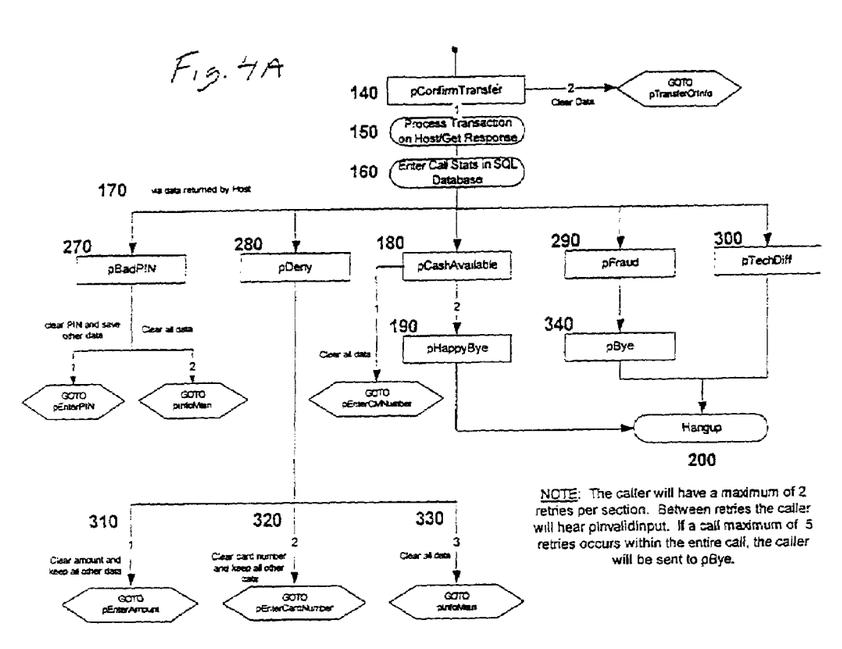
FIG. 4A shows the pConfirm Transfer flow chart portion of the invention.
Figure 4B:
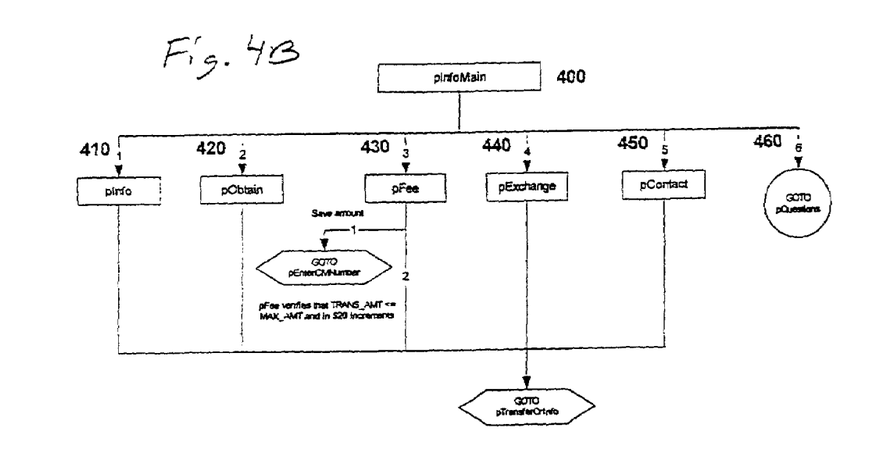
FIG. 4B shows the pinfoMain flow chart portion of the invention.
Figure 4C:
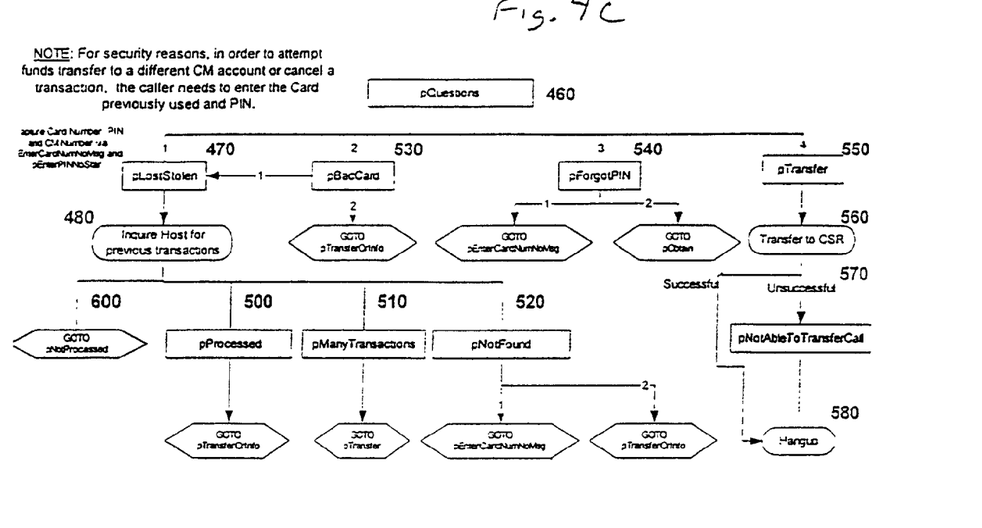
FIG. 4C shows the pQuestions flow chart portion of the invention.
Figure 4D:
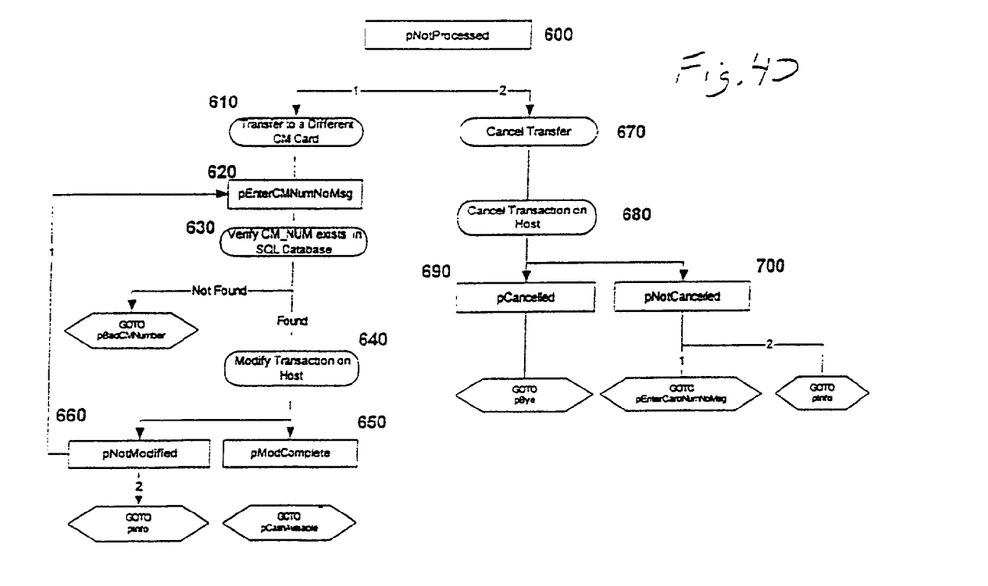
FIG. 4D shows the pNotProcessed flow chart portion of the invention.

FIG. 3 shows a detailed call flow chart of the invention for a progression of one successful money transfer transaction. FIG. 4A shows the pConfirm Transfer flow chart portion of the invention. FIG. 4B shows the pinfoMain flow chart of the invention. FIG. 4C shows the pQuestions flow chart portion of the invention. FIG. 4D shows the pNotProcessed flow chart portion of the invention.

Referring to FIGS. 3 and 4A-4D, a progression of one successful money transfer through this invention begins at box 10 and concludes at box 200. At box 10, the caller using a touch-tone telephone dials a toll free number and gets routed from the call center to the invention system. At 20, initial call statistics (location of caller, identity of caller, and the like) are written to a Database Server. At 30, the caller hears a greeting from the invention system. At 40, the caller is prompted to enter a number corresponding to which language they would like to hear the prompts in. This value is used to set language parameters in the application. Currently for example, 1 can be setup for English and 2 can be setup for Spanish. At 50, the caller is played the needed requirements(do they have a credit card, debit card, ATM(automated teller machine) card with PIN(personal identification number), Cash Magic card(debit type card for use with this invention). At 60, the caller is asked if they would like to transfer cash or get information on the system. At 70, to transfer cash, a 1 can be pressed, and 400 to get information, or 2 can be pressed.

At 70, the caller is prompted to enter their magnetic card number(credit card, debit card, bank card, ATM card, Cash Magic card). If the caller presses the * key because they do not know this number they go to 220. Once at 220, the caller can be told that they will need this number to transfer funds through the invention system. They are then given the option of hearing information on how to obtain a Cash Magic card, go to 420, or listen to general information on the invention's automated system, go to 400.

At 80, the caller is read back the magnetic card number entered and asked to Press 1 to confirm, or 2 to re-enter it. At 90, the magnetic card number entered is verified in the database as a valid number on the system. If it is valid, the caller can continue. If the number is invalid, they go to 230, which will tell the caller that they need to have a valid magnetic card number to use the system. The invention will then allow the caller to enter a different number by pressing 1 or give the caller information on the Cash Magic system by pressing 2, go to 410.

At 100, the caller is next prompted to enter a credit card, ATM, or debit card number to transfer the money from. At 110, the caller is next prompted to enter the PIN(personal identification number) associated with the credit card, ATM, debit card, bank checking account, bank savings account that the money is being transferred from. If the * key is pressed, the caller does not know the PIN and goes to 240. This prompt will tell the caller that they need to know the PIN to use the invention system. The caller will be offered a choice of getting information on the invention's automated system by pressing 1, go to 400, or exiting the system by pressing 2, go to 340, if they do not know this PIN, or to go to a live operator for assistance in making the transfer with other information.

At 120, the caller is prompted to enter the amount of the transfer in $20 increments(while $20 is referred here, other increment value amounts less than or greater than $20 can be used).

At 130, the amount entered is verified to be in $20 increments and that it does not exceed the maximum single transfer limit of the invention system. If the amount is in $20 increments and is below the maximum single transfer limit, the caller goes to 140. If the entered amount is greater than the maximum single transfer amount, the amount is set to that limit and the caller is prompted in 250 to press 1 if this amount is acceptable or press 2 to enter a new amount. If the amount entered is not in $20 increments, the amount is set to the next higher $20 increment below the maximum single transfer limit and the caller is prompted at 260 to enter 1 if this amount is acceptable or 2 to enter a new amount.

Referring to FIGS. 3 and 4A, at 140, the caller is read back the transfer information and asked to confirm the transfer by pressing 1. If the caller declines the confirmation, by pressing 2, all data is cleared and the caller is returned to 60.

At 150, this transaction is processed by the Bank (3 FIG. 2). The data entered is checked for fraud, adequate account balance, PIN security, and system availability. This data is passed to the IVR computer.

At 160, the data passed by the Bank is written to a computer for tracking by the invention system.

At 170, depending on the data returned by the Bank, the application can take various paths. If all checks are passed, the application goes to 180. Checks are performed to verify that several conditions do not exist. For example, if an invalid PIN was used, go to 270. If proper credit is unavailable for this transaction, go to 280. If the card has been marked as fraudulent, go to 290. And if the Bank verification is unavailable, go to 300.

At 180, the caller is told that the transfer was successful and is prompted to enter another transfer by pressing 1, go to 70. Or indicate that they are done, by pressing 2, go to 190.

Box 190 refers to the system thanking the caller for using the invention system. At 200, the application hangs up and resets the channel for the next call.

At 270, the data returned by the Bank indicates that the PIN number used is invalid. The caller can enter the PIN again by pressing 1, go to 110; or the caller can press 2 to get information on the invention system, go to 400.

At 280, the data returned by the Bank indicates that the amount entered by the caller is not available for this transaction. The caller is prompted to enter a lower transfer amount, by pressing 1 (310), go to 120; use a different card to transfer the money from, by pressing 2 (320), go to 100; or get information on the invention system by pressing 3 (330), go to 400.

At 290, the data returned by the Bank indicates that the data entered by the caller is fraudulent. In this case, the system immediately plays the caller a goodbye message at 340 and hangs up at 200. It is possible to also restrict the magnetic card use if this is encountered.

At 300, in this scenario, the Bank is unavailable for transaction processing. The caller is played a technical difficulty message and then a hang up occurs at 200.

Referring to FIGS. 3 and 4B, when information is requested about the invention system, the processing begins at 400.

Referring to FIGS. 3 and 4B, at 400, the caller enters the information branch and is prompted to enter 1 to hear general information about the system, go to 410; enter 2 to hear information of how to obtain a Cash Magic magnetic card, go to 420; enter 3 to hear the fee structure for a money transfer to a magnetic card(Cash Magic card, debit card, credit card, bank card, ATM card), go to 430; enter 4 to hear International Exchange Rates, go to 440; enter 5 to hear information on how to contact the system, go to 450; Cash Magic; or enter 6 if you have questions about a Cash Magic transfer, go to 460.

At 410, the caller hears general information about the invention system and goes to 60. At 420, the caller hears information on how to obtain Cash Magic magnetic card and goes to 60. At 430, the caller is prompted to enter a transfer amount and is spoken the fee associated with this transfer amount. After this is completed, the caller is asked to enter 1 if they would like to process this transfer amount and goes to 70 to enter their Cash Magic card number. If 2 is pressed, the caller is sent to 60. At 440, the caller hears International Exchange rates and goes to 60. At 450, the caller hears contact information for system and goes to 60.

Referring to FIGS. 1 and 4C, at 460, the caller can receive information to their questions. The caller is prompted to enter 1 if their Cash Magic card has been lost or stolen, go to 470; enter 2 if the Cash Magic card does not function, go to 530; enter 3 if you have forgotten your Cash Magic PIN, go to 540; or enter 4 to transfer to a live operator, go to 550.

At 470 the system prompts the caller to enter their Cash Magic card number that was lost, stolen, or inoperable.

At 480, once the caller's Cash Magic card number is entered, their transaction history is queried via the Database Computer. The results of this query determine where the caller goes next in the application. If caller has a transaction that has not been processed, they go to 600; if the caller has a transaction that has already been processed they go to 500; if the caller has more than one pending transaction, they go to 510; and if the caller has no pending transactions they go to 520.

At 500, the caller is told that the transaction has already been processed and is sent to 60. At 530, the caller is spoken information regarding the bad card and is offered a choice of pressing 1, to go to the Lost/Stolen logic at 470 or press 2 to go to 60.

At 540, the caller is told that they need to have the Cash Magic card PIN to process a transaction on this card. The caller can the press 1 to transfer the amount to a different Cash Magic card, at 620; or press 2 to get information on how to obtain a new Cash Magic card, go to 420.

At 550, the caller is told to standby while they are transferred to an operator. At 560, the call is transferred to an operator. If the transfer is successful, go to hang up at 580. If the transfer is unsuccessful, a prompt is spoken at 570 to tell the caller that the transfer was not able to take place and the hang up occurs at 580.

At 570, the invention system plays an unsuccessful transfer message and hangs up at 580 which hangs up the line and frees the channel for the next caller.

Referring to FIG. 3 and 4D, at this point 600, data from the Bank indicates that the caller's transaction has not yet been processed. The caller is prompted to transfer this amount to a new Cash Magic card by pressing 1, go to 610; or press 2 to cancel this transaction, go to 670.

At 620, the caller is prompted to enter the new Cash Magic account number, which is receiving the funds. At 630, the new Cash Magic number is verified as operational in the Database. If the number entered is valid, go to 640, if the number entered is invalid, go to 230. At 640, this transaction modification is sent to the Bank for processing. If successful, go to 650; if unsuccessful, go to 660. At 650, the caller is told that the modification is complete and sent to 180. At 660, the caller is told that the modification did not take place and is sent to 410. At 680, the cancel transaction is sent to the Bank for processing. And if successful, go to 690; if unsuccessful, go to 700. At 690, this prompt tells the caller that their transaction has been successfully cancelled and sends them to 340.

At 700, this prompt tells the caller the cancellation was unsuccessful. The caller is then prompted to enter 1 to try again, go to 630; or enter 2 for more information, go to 410(FIG. 4B).

Figure 5:
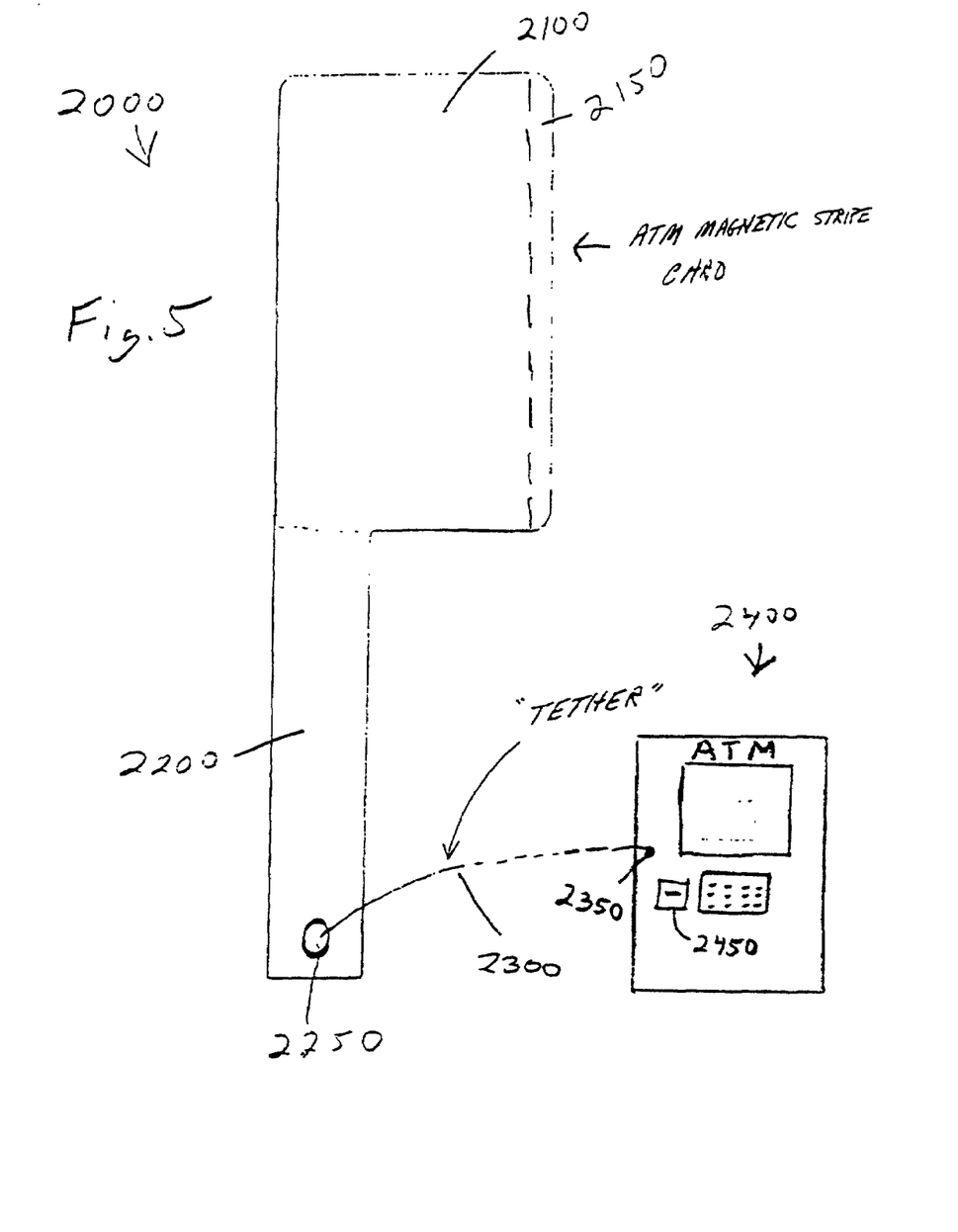
FIG. 5 shows a modified magnetic card that can be used with the subject invention.

FIG. 5 shows a modified magnetic tethered card 2000 that can be used with the subject invention. Magnetic card 2000 can include a rectangular card portion 2100 with magnetic strip portion 2150, and extending from one corner of the card 2100 a longitudinal thin rectangular strip portion 2200 having an aperture 2250 at the end with a flexible tether line 2300 for attaching the modified card 2000 to an ATM(automated teller machine) 2400.

This extended-card 2000 can be attached or tethered to an ATM 2400 for use by a recipient that is not in personal possession of any magnetic card that can use an ATM machine. The extended-card 2000 can be constructed so as to have the standard and usual magnetic stripe ATM card dimensions 2100 and magnetic stripe 2150 as the first portion of the card. The extended-card 2000 can be inserted into an ATM terminal device opening or "swiped" through an ATM "card swipe" if the ATM was constructed with a "card swipe" rather than a card insertion opening. The magnetic stripe information from the tethered card 2000 can be assimilated and communicated through the presently existing and potentially future existing magnetic stripe processing devices and networks in the same manner otherwise described in this invention.

Referring to FIG. 5, extended-card 2000 can have an extension 2200 in the rear portion which will, when the extended-card is used, extend beyond a presently existing or future existing ATM magnetic card insertion opening or "card swipe" device. The extended-card can have a hole 2250 or other suitable means to have a tether 2300 that can include but not be limited to a chain, cord or other suitable tether attached to the extended portion of the extended-card 2000.

The other end 2350 of the tether 2300 can be fixably attached to the ATM(automated teller machine) 2400 in a manner similar in principle to that presently utilized in retail stores to allow an item for sale to be displayed in a manner that permits mobility of the item for examination, while fixably securing the item to a display counter. The tether 2300 can be attached to a fixture device 2350 or other medium which can be glued or otherwise attached to the ATM 2400 or to a location suitably close to the ATM 2400 and within reach of the card tether 2300. The ATM 2400 can be an ATM such as for example, those manufactured by INTERBOLD "I" Series, and several year old or older NCR model ATMs, in which a traditional rectangular magnetic card is completely inserted inside an access opening 2450 such as a slot or a slot with a door which closes after a rectangular card is inserted inside. With the novel card 2100, the extended portion 2200 remains outside the slot 2450, or in the case of a sliding door, the sliding ATM door can be stopped from closing because of the extended portion 2200, which will not interfere with or disrupt the transaction.

Referring again to FIG. 5, the card account number including that portion described as a PIN can be communicated by the intended recipient to the sender and the transfer made to that account. Alternatively, the transfer could be made to any of the system's primary account numbers to be accessed with the latter portion of the account number described and utilized as a PIN. In the latter application the PIN portion of the account number can be selected by the recipient or the sender and entered in the sending process in response to a suitable addition to the IVR prompts or randomly assigned by the system and communicated to the sender who will communicate same to the recipient.

The recipient can access the ATM 2400 with the tethered card 2000 and implement the receipt of the transferred cash by entering that portion of the account number described as a PIN in response to the ATM prompt for the PIN as such PIN portion of the account number has been provided for above.

Figure 6:
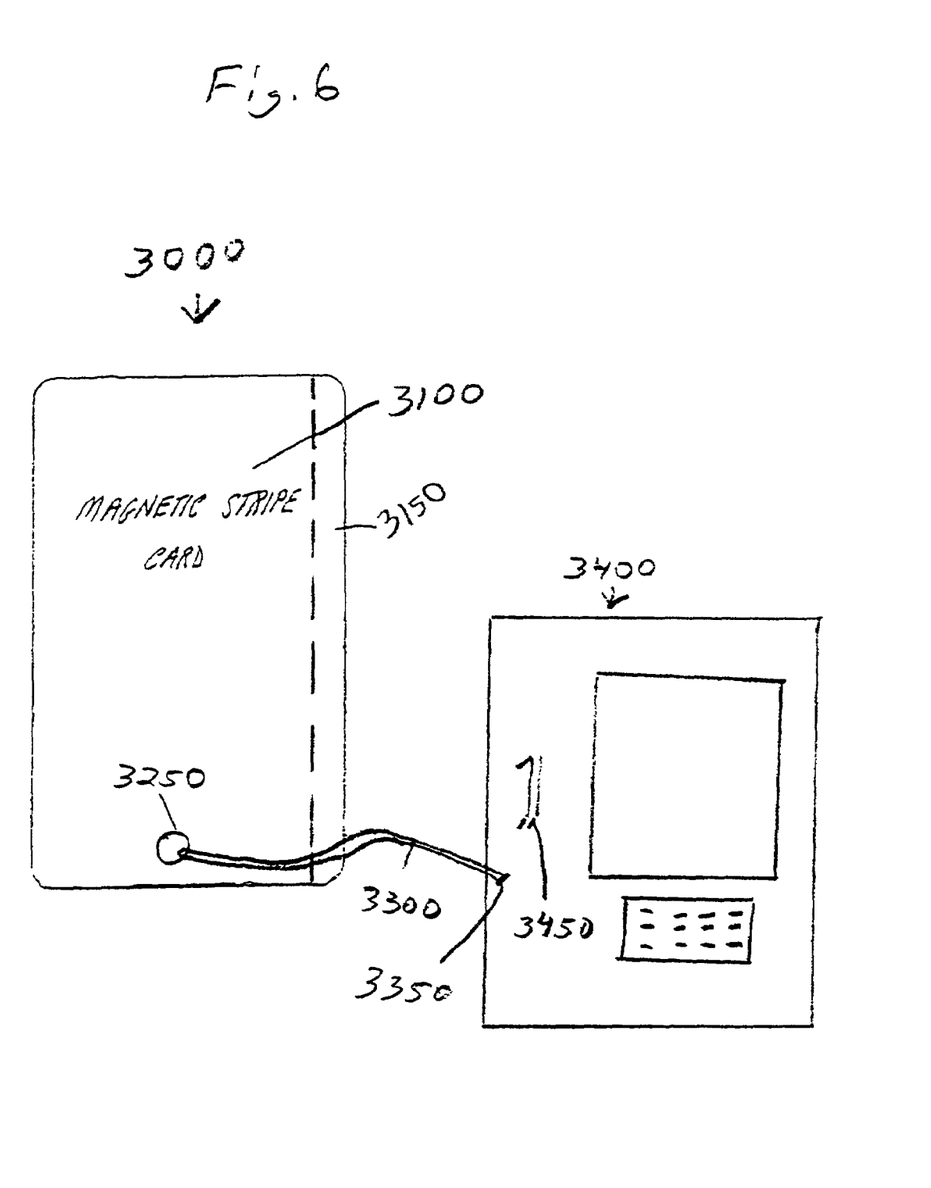
FIG. 6 shows another modified magnetic card that can be used with the subject invention.

FIG. 6 shows another modified magnetic card 3000 that can be used with the subject invention. Magnetic card 3000 can include a rectangular card portion 3100 with magnetic strip portion 3150, and extending from one corner of the card 3100 and an aperture 3250 at a corner other than one having the magnetic strip 3150. The aperture allows for a flexible tether line 3300 such as a chain, cord, and the like, for attaching the modified card 3000 to an ATM(automated teller machine) 3400.

This novel card 3000 can be attached or tethered to an ATM 3400 for use by a recipient that is not in personal possession of any magnetic card that can use an ATM machine. The extended-card 3000 can be constructed so as to have the standard and usual magnetic stripe ATM card dimensions 3100 and magnetic stripe 3150 as the first portion of the card. The novel card 3000 can be inserted into an ATM terminal device opening or "swiped" through an ATM "card swipe" if the ATM was constructed with a "card swipe" rather than a card insertion opening. The magnetic stripe information from the tethered card 3000 can be assimilated and communicated through the presently existing and potentially future existing magnetic stripe processing devices and networks in the same manner otherwise described in this invention.

Referring to FIG. 6, card 3000 can be used in both an ATM having an ATM magnetic card insertion opening or "card swipe" device. The tether 3300 can be fixably attached at one end to the magnetic card 3000, and the other end 3350 of the tether 3300 can be fixably attached to the ATM(automated teller machine) 3400 in a manner similar in principle to that presently utilized in retail stores to allow an item for sale to be displayed in a manner that permits mobility of the item for examination, while fixably securing the item to a display counter. The tether 3300 can be attached to a fixture device 3350 or other medium which can be glued or otherwise attached to the ATM 3400 or to a location suitably close to the ATM 3400 and within reach of the card tether 3300. The ATM 3400 can be an ATM such as for example, a magnetic card swipe model NCR model ATMs, in which magnetic strip portion 3150 of card 3000 is swiped into a swiping channel 3450 on the ATM 3400.

Both the novel magnetic cards 2000 FIG. 5 and 3000 FIG. 6 can be used with either slot opening ATMs, slot and sliding door version ATMs, and side swiping channel version ATMs.

As previously discussed, the invention uses magnetic cards such as credit cards, debit cards, bank cards, and ATM(automated teller machine) cards, and can use a specialized magnetic card earlier referred to as a Cash Magic card. The Cash Magic cards can be sold initially at retail stores for example, at $3.00 and the retail stores can purchase these for example at $1.50, giving a 100% sales profit to the merchant. Stores that presently sell another provider's pre-paid phone card may, particularly at the outset, choose to sell only this card.

Alternatively, retail stores can also sell specialized cash magic cards combined with a phone card. For example, the Cash Magic card can have an account that can have money transferred to by a sender on one side of the card, and the other side of the card can be a phone card with for example, 20 minutes pre-paid phone time for a price of for example, $5.00. These cards can have a magnetic stripe on each side, one for the cash transfer application and one for the phone card.

Figure 7A:
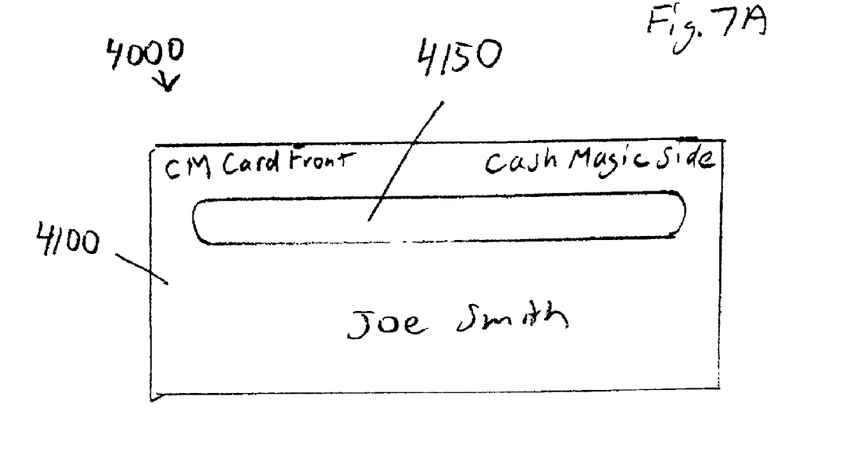
FIG. 7A shows a front side of a novel double magnetic striped card for use with the invention.

FIG. 7A shows a front side 4100 of a card 4000 having magnetic stripes on both sides. In FIG. 7A, a magnetic stripe 4150 can be located across an upper longitudinal portion of the front side 4100 of the card. On the front side 4100, the magnetic stripe 4150 can be used for the cash magic operation.

Figure 7B:
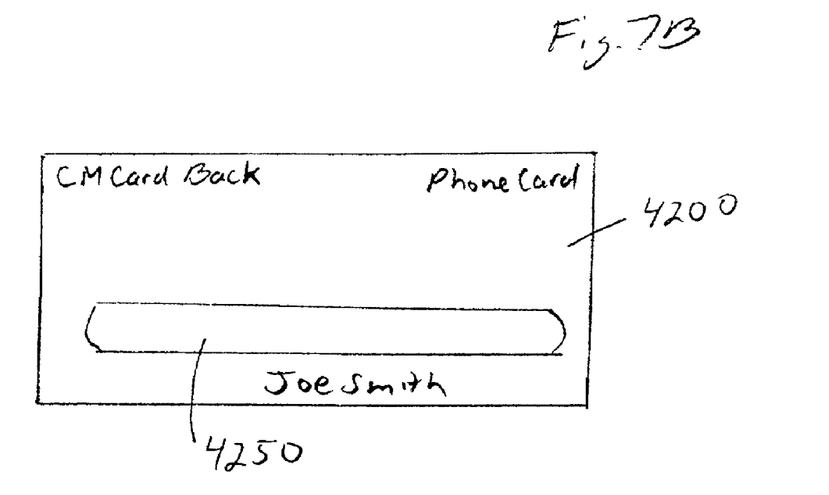
FIG. 7B shows a back side of the double magnetic striped card of FIG. 7A.

FIG. 7B shows a back side 4200 of the card 4000 with the magnetic stripe 4250 that can be located across a lower longitudinal portion of the back side 4200 of the card 4000. On the back side 4200 of the card 4000, the magnetic stripe 4250 can be used for other transactions such as but not limited to being used as a phone card, a credit card, a debit card, bank card, ATM card, or a bank checking account, bank savings account, and the like. Thus, the invention can allow for a single card to be used for different transactions, that can have funds authorized by the same sender/recipient system described in the invention. Additionally, the double magnetic sided cards 4000 can have a cash magic side, and a separate side having pre-existing funds or separately generated funds for making transactions.

The owners of this system can sell the basic cards for a wholesale price of for example, $2.50 giving a 100% sales profit to the merchant. The Cash Magic type cards may be purchased when needed to access an ATM, or purchased in advance for ready availability for future use.

The invention can be used by specific employers giving out Cash Magic(CM) type magnetic cards to their employees. Each employee can receive one or more CM cards. The CM computer program supplied can put an employee information format onto a computer monitor. The employer will fill in the information needed for the later determination of withholding taxes and other payroll computations. The employee can supply the CM account number, without the PIN(personal identification numbers), which is to receive the net pay. Alternatively the employee can supply more than one CM card account number and the amounts or percentages to be transferred to each. One or more CM cards can be sent, or otherwise acquired by dependent relatives, even in Mexico or another country, to receive a portion of the employee's income. The PIN number can be changed by calling a CM toll-free service center number and following the I.V.R. prompts.

The employee can put his card through the "Card Swipe" when starting work and when stopping. The CM computer program can compute the time worked, the gross pay, the deductions, and the net pay.

The "Card Swipe" can be at the employer's location or the work-site with a portable personal computer. Transfers can be made on a daily basis, or such basis as preferred by the employer. The money transfer can be implemented by calling a special toll-free number, which will access and download the payroll information into the CM computer payroll program. Alternatively, a CM website can also safely receive encrypted information from the employer's computer.

The CM(cash magic) employer computer program can transfer each employee's net pay from the employer's payroll account to the Cash Magic account. The system can deduct an agreed fee or service charge and split deposit the balance to the individual employee's CM escrow account, or accounts, accessible with the CM magnetic stripe card(s) from any ATM with the addition of the PIN number correlated to that account.

The transfer to the employee's CM(cash magic) escrow account(s) accessible from any domestic or foreign ATM can occur virtually simultaneously with the implementation by the employer. The employer can also elect to transfer withholding taxes to a CM escrow account.

The invention system can benefit employers by providing an easy to use, accurate, time saving, and inexpensive payroll system. The automated system can eliminate bookkeeping, payroll and tax computations, check writing and virtually all expenses normally associated with the employee payroll. Employer and employee statements can be acquired from the CM computer periodically and on demand.

The invention system can benefit employees by providing a quick, easy to use method to receive pay, as earned, without a traditional bank account, and to send a portion of the pay to a relative, even in another country, at low cost and without any effort.

An alternative method can also be provided for employers without computers. The CM(cash magic) invention system can also provide the necessary payroll computations. The individual employee's information can be entered by accessing a CM toll-free number and I.V.R. prompts will stimulate the entry of information with a touch-tone keypad. The card swipe can then be connected to the CM program, set up for that employer, with a telephone line connection to the CM computer, which will perform all computations and transfers.

Another alternative method would be to use live or automated operators, or combinations thereof, for all or part of the process steps of the invention.

The CM employer payroll system which combines a "Card Swipe", an accounting system, a tax and payroll computation system and a virtually simultaneous ATM cash pay-out system, virtually without employer time or effort, can be an extreme improvement over all present "state-of-the-art" payroll systems. The invention can be of particular benefit to more than 35% of American adults who do not have bank accounts and to those who employ them.

A "Service Provider" using the system(such as an employer or a merchant processing a sending implementation) can accept and retain a portion of the processing fees such as a 20% service fee for the service rendered, which amount can be discounted from the CM(cash magic) fee, or refuse it as a "perk" or job benefit to the employee or an advantage to a customer if the provider is a merchant.

Although the preferred embodiment describes using a touch-tone telephone to send the money transfer, other mediums such as but not limited to PC(personal computers) connected to modems, the Internet, merchant card swipe machines, live telephone operators, P.O.S.(Point of Sale Terminals, and automated telephone operators can also be used to authorize the sending of the money transfer.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for sending cash money transfers at anytime from anyone to a remotely located party, comprising the steps of:

providing a sender with available funds, the available funds being selected from one of: a credit card of the sender and a debit card of the sender, wherein the sender is adapted to be solely a human-sender;

providing a recipient being remotely located from the sender, wherein the recipient is adapted to be solely a human-recipient, wherein the sender and the recipient are different from one another;

communicating an unplanned request for cash funds from the remotely located recipient to the sender;

providing a toll free telephone number to a remotely located IVR(interactive voice response) computer system;

connecting the sender to the IVR(interactive voice response) computer system by a communication medium using the toll free telephone number, the communication medium being selected from one of a phone and a computer modem, the IVR system receives multiple simultaneous calls from different senders and prompts each sender to enter transfer authorization data, the IVR system processes the data in automated modes with software and converts the data to language of existing banks, processors, processing networks and clearing houses, and the IVR system processes the transfer with transmission lines and electronic mediums, the electronic mediums being different from the communication medium;

providing a national bank escrow account for a Cash Card, the Cash Card having a magnetic stripe, wherein the Cash Card is solely used for paying out cash transfers;

providing the recipient with the Cash Card and a PIN number solely for paying out cash transfers;

authorizing a transfer of cash to the recipient-card by the sender entering responses to automated prompts from the remotely located IVR system, solely through the connection medium;

transferring the cash from accessible funds of the sender to the recipient-card by the sender solely using the connection medium and the IVR system;

providing a remotely located automated terminal, the terminal being selected from one of an existing ATM(automatic teller machine) and an existing POS(point of sale terminal);

physically presenting the recipient-card by the recipient to the remotely located automated terminal; and physically retrieving the cash by the recipient using the PIN number along with the recipient-card having the magnetic stripe at the remotely located automated terminal; and repeating the above steps between the different senders and different recipients causing simultaneous cash money transfers from the different senders and the different recipients.

2. The method of claim 1, wherein the communication medium is solely the phone with the sender using the toll-free number on the phone.

3. The method of claim 1, wherein the authorizing step includes the IVR system prompting the sender to enter the amount to be made available from an ATM in multiples of $20.00.

4. The method of claim 1, further comprising the step of: automatically computing a transfer charge fee solely for each sender.

5. The method of claim 4, further comprising the step of: communicating the transfer charge fee from the IVR system to the sender before the transferring of the cash from the available funds of the sender.

6. The method of claim 5, wherein the authorizing step further includes the step of: authorizing the transfer of the cash and the payment of the transfer charge fee after the sender affirmatively responds to additional prompts from the IVR system, and agrees to the cash transfer and to pay the transfer charge.

7. The method of claim 1, wherein the authorizing step further includes the step of the sender: entering the magnetic stripe card number of the recipient-card that is to be used to retrieve the cash value.

8. The method of claim 1, wherein the IVR system processes the transfer without any pre-established account link between the sender and the recipient.

9. The method of claim 1, wherein, the IVR system takes monies from the sender's available funds with a split deposit to process an authorized cash transfer, plus a reserve for a terminal surcharge to the recipient-card account and the balance to an income account.

10. The method of claim 1, wherein the unplanned request for cash funds is an emergency request.

11. The method of claim 1, wherein the step of physically retrieving the cash includes the step of the recipient:
entering the recipient card number and the PIN number of the recipient-card to provide for secure receipt by the recipient who is in possession of both the recipient-card with the magnetic stripe and the PIN number associated with the recipient-card.

12. The method of claim 1, wherein the method virtually simultaneously implements ATM pay-out and payment of any ATM surcharge.

13. The method of claim 1, wherein the method transfers any excess surcharge reserve to an excess transfer reserve income account.

14. The method of claim 1, further comprising the step of: automatically and virtually simultaneously transferring the cash transferred to the recipient plus a reserve for a terminal charge, from the available funds of the sender to the national bank escrow account so that the bank escrow account temporarily holds the cash.

15. The method of claim 14, further comprising the step of: automatically and virtually simultaneously transferring the cash from the bank escrow account to the remotely located automated terminal account when the recipient is using the Cash Card.

16. The method of claim 1, further including the step of the recipient: selecting the PIN number of the Cash Card, mad including the step of the sender: entering the PIN number in response to additional prompts from the IVR system.

17. The method of claim 1, wherein, the Cash Card includes:
a second magnetic stripe on a back side to be used as at least one of: a prepaid phone card, a credit card and a debit card.

18. The method of claim 1, wherein the method includes the step of: providing for receiving cash automatically in other than the currency of origin at the current foreign rate of exchange at a payout time.

19. The method of claim 1, wherein the communication medium is solely through the internet.

20. The method of claim 1, wherein the method and the IVR system will provide that all transaction related information that will need to be used by both the sender and the recipient, will be conveyed by the recipient to the sender.

21. The method of claim 1, wherein the method of the sending cash money transfers is not in response to a pre-existing transactional relationship between the sender and the recipient, and wherein the method of the sending cash money transfers is not from a sales transaction where a seller receives payment from a buyer, and wherein the method of sending cash money is not a "wire transfer" and wherein the method of sending cash money does not require a pre-existing account link with the existing ATM.

22. The method of claim 1, further comprising the steps of:
providing that no business and no transaction information will be conveyed by the sender to the recipient since the recipient is in possession of both the recipient-card and the PIN number associated with the recipient-card, and the recipient does not communicate with the computer system prior to access of the transferred cash.

23. The method of claim 1, wherein the sender closes a Cash Card account for the Cash Card by telephone, and requests a refund for any remaining amount in the Cash Card account.

24. A method for transferring money funds from senders to recipients, each sender adapted to be solely a human-sender, and each recipient adapted to be solely a human-recipient, consisting of the steps of:
providing each sender with available funds, the available funds being selected from one of: a credit card of the sender and a debit card of the sender;

providing a toll free telephone number to a remotely located IVR(interactive voice response) computer process;

providing for each recipient to remotely communicate an unplanned request to the sender for emergency cash, the recipient being different from the sender and the recipient being physically located apart from the sender;

connecting the sender to the remotely located IVR computer process by a connection medium using the toll free number in response to the communicated request, the connection medium being selected solely from one of a phone and a computer modem;

providing a national bank escrow account for a Cash Card, the Cash Card having a magnetic stripe, wherein the Cash Card is solely used for paying out cash transfers;

providing the recipient with the Cash Card and PIN number for solely paying out cash transfers;

determining cash to distribute to the recipient-card by the sender entering responses to automated prompts from the remotely located IVR system, solely through the connection medium and the IVR computer process;

physically presenting the recipient-card by the recipient to a remote automated terminal, the remote automated terminal being solely selected from at least one of: an existing ATM (automated teller machine) and an existing POS (point of sale terminal);

transferring the cash from accessible funds of the sender to the national bank escrow account by the sender solely using the connection medium and the IVR computer process;

physically retrieving the cash transferred to the recipient-card by the recipient at the remote terminal presenting the recipient-card and PIN; and providing that no business and transaction information will be conveyed by the sender to the recipient since the recipient is in possession of both the recipient-card and the PIN number associated with the recipient-card, wherein the method for transferring of the money funds is not in response to a pre-existing transactional relationship between the sender and the recipient, and wherein the method for transferring of the cash is not from a sales transaction where a seller receives the payment from a buyer; and repeating the above steps causing simultaneous money fund transfers from the different senders and different recipients.

25. The method of claim 8, wherein the IVR computer system processes the data in automated modes with software and converts the data to language of existing banks, processors, processing networks and clearing houses.

26. The method of claim 24, wherein the IVR computer process processes the transfer without any pre-established account link between the sender and the recipient, and wherein the IVR computer process processes the data in automated modes with software and converts the data to language of existing banks, processors, processing networks and clearing houses.

27. The method of claim 24, wherein, the Cash Card includes:

a second magnetic stripe on a back side to be used as at least one of: a prepaid phone card, a credit card and a debit card.

28. The method of claim 1, wherein the authorizing step further includes the step of the sender: entering sender's credit card account and debit card account numbers to be processed through the communication medium associated with one of the credit card of the sender and the debit card of the sender.

* * * * *